United States Patent
Albrecht

(10) Patent No.: US 6,616,532 B2
(45) Date of Patent: Sep. 9, 2003

(54) ELECTRONIC GAME ENHANCEMENT SYSTEMS AND METHODS

(76) Inventor: John M. Albrecht, 3620 N. 6th Ave., Ste 204W, Phoenix, AZ (US) 85013

( * ) Notice: Subject to any disclaimer, the term of this patent is extended or adjusted under 35 U.S.C. 154(b) by 0 days.

(21) Appl. No.: 09/846,587

(22) Filed: May 1, 2001

(65) Prior Publication Data

US 2002/0128069 A1 Sep. 12, 2002

Related U.S. Application Data

(60) Provisional application No. 60/248,039, filed on Nov. 13, 2000.

(51) Int. Cl.[7] ............................................. A63F 13/00
(52) U.S. Cl. ............................................. 463/29; 463/43
(58) Field of Search ............................ 463/29, 43, 44; 705/14, 18

(56) References Cited

U.S. PATENT DOCUMENTS

| | | | |
|---|---|---|---|
| 5,618,045 A | 4/1997 | Kagan et al. | 463/40 |
| 5,624,316 A | 4/1997 | Roskowski et al. | 463/45 |
| 5,768,382 A | 6/1998 | Schneier et al. | 380/251 |
| 5,885,156 A | 3/1999 | Toyohara et al. | 463/1 |
| 5,970,143 A | 10/1999 | Schneier et al. | 713/181 |
| 6,165,068 A | 12/2000 | Sonoda et al. | 463/8 |
| 6,298,332 B1 * | 10/2001 | Montague | 705/27 |

\* cited by examiner

*Primary Examiner*—Andrew M. Dolinar
(74) *Attorney, Agent, or Firm*—Parsons & Goltry; Michael W. Goltry; Robert A. Parsons

(57) ABSTRACT

An electronic game enhancement system including an electronic game stored in game memory, an electronic game device for accessing and playing the electronic game, an electronic component stored in the memory of a memory device for enhancing the electronic game, a consumer instrument associated with the memory device, and a data transfer system associated with the electronic game device and the memory device for facilitating a transfer of the electronic component from the memory of the memory device to the game memory for enhancing the functionality of the electronic game.

12 Claims, 1 Drawing Sheet

ELECTRONIC GAME ENHANCEMENT SYSTEMS AND METHODS

CROSS-REFERENCE TO RELATED APPLICATION

This application claims the benefit of Provisional Application Serial No. 60/248,039, filed Nov. 13, 2000.

FIELD OF THE INVENTION

This invention relates to electronic games and to systems and methods for enhancing electronic game functionality.

BACKGROUND OF THE INVENTION

Electronic games are enormously popular. The growth in the market of electronic games is fueled by not only consumer demands for new and interesting electronic games but also innovations in the technology by which electronic games are played. Advancements in electronic game technology is marked as much by efforts to provide inexpensive, hand-held electronic game device or personal game devices and increased miniaturization of hand-held electronic game devices as it is by improvements toward networked gaming environments, improved means for providing communication between electronic game devices and various systems and methods for enhancing electronic game functionality. Although the field of electronic games is robust and dynamic, consumer needs for advanced technology and new and improved electronic games continues to promote advancements in this field of endeavor.

In this spirit, there is a need for new and improved systems and methods for enhancing the functionality of electronic games and for marrying electronic game enhancement technology with consumer products and services and advertisements.

SUMMARY OF THE INVENTION

The above problems and others are at least partially solved and the above purposes and others realized in an electronic game enhancement system including an electronic game stored in first memory, electronic apparatus having an input device responsive to commands for accessing and playing the electronic game and an electronic component stored in second memory. The electronic component is for enhancing the electronic game. A consumer instrument is associated with a device containing the second memory. A data transfer system is associated with the electronic apparatus and the device for facilitating a transfer of the electronic component from the second memory to the first memory for enhancing the electronic game. The consumer instrument includes a consumer product, and the device is attached to one of the consumer product and packaging of the consumer product. In another embodiment, the consumer instrument is a service that is to be purchased, and the device is made accessible after a purchase of the service. In yet another embodiment, the consumer instrument is an advertisement, and the device is made accessible by way of the advertisement.

In a further embodiment, the invention provides an electronic game enhancement system including an electronic game stored in memory, electronic apparatus having an input device responsive to commands for accessing and playing the electronic game and an electronic component stored in password-accessible memory. The electronic component is for enhancing the electronic game, and a consumer instrument is associated with a password to the password-accessible memory. The electronic component is accessible by the electronic apparatus in response to entry of the password into the electronic apparatus with the input device. In another embodiment, the password-accessible memory is accessible in response to entry of the passwoord into a data transfer station such as a computer, and wherein the electronic component is capable of then being downloaded to the electronic apparatus and, more particularly, to the memory that stores the electronic game.

Consistent with the foregoing, the invention also incorporates associated methods. One method of enhancing electronic game functionality includes steps of providing an electronic game stored in first memory and electronic apparatus having an input device responsive to commands for accessing and playing the electronic game and providing an electronic component stored in second memory. The electronic component is for enhancing the electronic game. The method further includes associating a consumer instrument with a device containing the second memory, and associating a data transfer system with the electronic apparatus and the device for facilitating a transfer of the electronic component from the second memory to the first memory for enhancing the electronic game. Associating the consumer instrument with the device can include attaching the device to one of a consumer product and packaging of a consumer product. Associating the consumer instrument with the device can also include permitting access to the device, for instance after paying a fee for a service.

In still another embodiment of the invention, provided is a method of enhancing electronic game functionality including steps of providing an electronic game stored in memory and electronic apparatus having an input device responsive to commands for accessing and playing the electronic game and providing an electronic component stored in password-accessible memory. The electronic component is for enhancing the electronic game. The method further includes associating a password to the password-accessible memory with a consumer instrument and then obtaining the password from the consumer instrument. The password-accessible memory can be part of the memory of the electronic apparatus or other memory accessible by way of another device or computer having an input device. If the password-accessible memory is accessible by way of the electronic apparatus, the present method provides entering the password into the electronic apparatus with the input device for gaining access to the password-accessible memory and enhancing the electronic game with the electronic component. If the password-accessible memory is accessible by way of device other than the electronic apparatus, the present method provides entering the password into the other device with its input device for gaining access to the password-accessible memory and then transferring the electronic component from the password-protected memory to the memory of the electronic apparatus by means of a data transfer system. This data transfer system is associated with the electronic device and the other device or computer and can be any system that is capable of transferring data from one memory to another memory. Associating the password to the password-accessible memory with a consumer instrument can include at least one of attaching the password to one of a consumer product and packaging of a consumer product, permitting access to the password after paying for a service, incorporating the password with an advertisement and affixing the password to a receipt.

BRIEF DESCRIPTION OF THE DRAWINGS

Referring to the drawings.

DETAILED DESCRIPTION OF A PREFERRED EMBODIMENT

Figure 1:
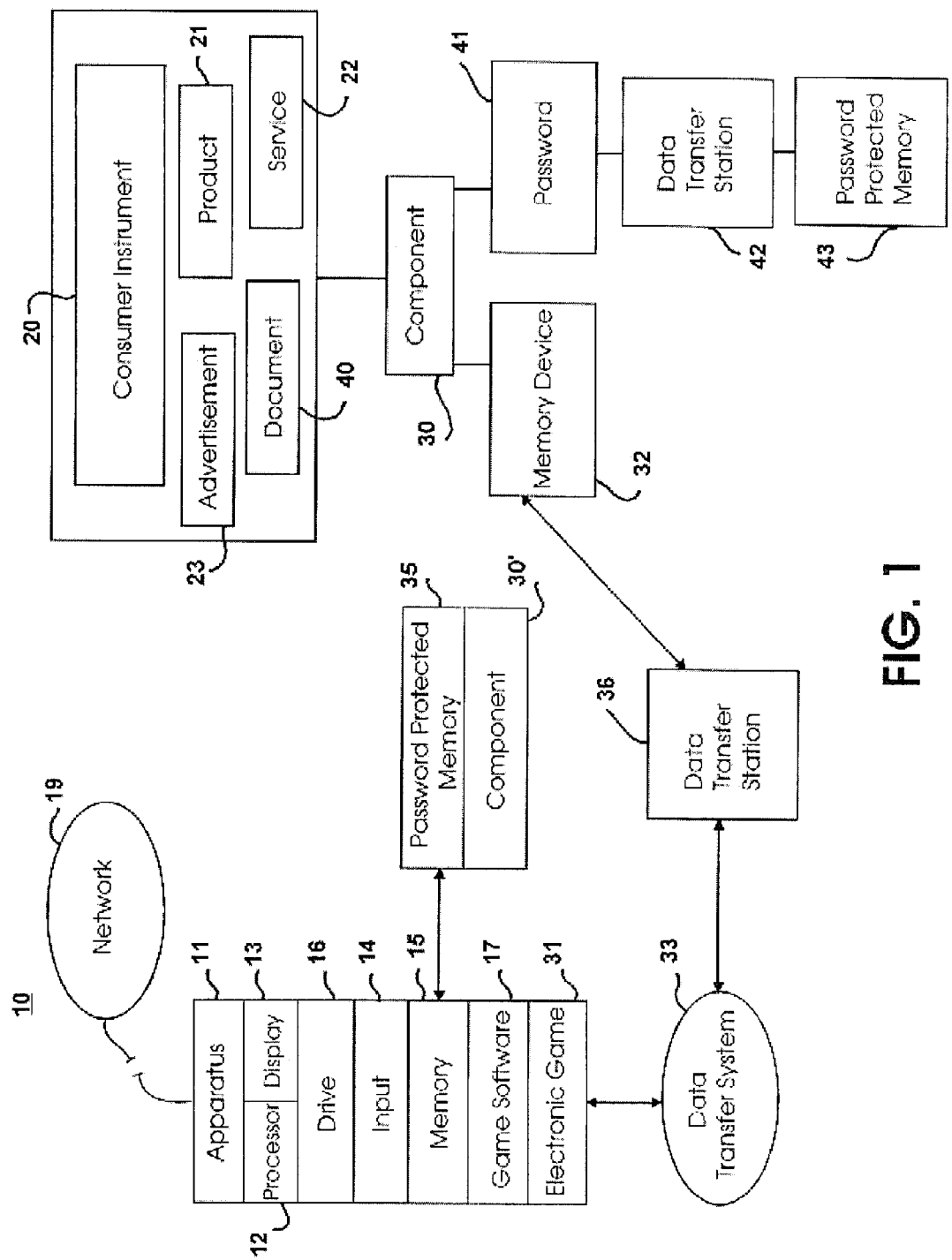
FIG. 1 is a schematic representation of an electronic game architecture, in accordance with the invention.

The invention is concerned with electronic games having electronic characters or features that the player of the game can control for the purpose of achieving a predetermined objective. This is typical of most electronic games and illustrative of many such characters or features include special powers, characteristics, weapons, ammunition, tools, devices, options, equipment, and other electronic items or attributes that help the player to progress through or otherwise develop the game. Some electronic games reward periodic successes with additional instrumentalities, which are required to progress through the game or otherwise help a player progress through the game. In other instances, a player may simply require a new instrumentality in order to progress through the game. In this vein, the invention provides a way that players can obtain instrumentalities needed to progress through an electronic game, which is played by a computerized device such a personal game device (PGA), a computer, etc.

Turning now to FIG. 1, a schematic view of an electronic game architecture 10 is shown. Architecture 10 includes electronic game apparatus 11 having a processor 12, a display 13 and an input device 14 such as a pointing device, a keypad or keyboard, a joystick, a wheel, etc. Apparatus 11 is capable of enabling a user to play an electronic game 31, and input device 14 provides a user with the ability to interact with electronic game 31. Apparatus 11 includes a hand-held electronic game device or personal game device (PGD), a modular game system of a type that is used in connection with a monitor or television, a personal computer, a laptop computer or any device or system that is capable of enabling a user to access and play an electronic game that is facilitated by game software 17. As is the case with virtually every device or system that is capable of enabling one or more users to play an electronic game facilitated by software, apparatus 11 functions in accordance with a suitable operating platform and is preferably provided with storage or memory 15 or with access thereto which houses game software 17, and that may be used for storing an electronic game in the course of play. Apparatus 11 is also furnished with a drive 16 for accommodating data cartridges, diskettes and/or compact discs for facilitating access to software embodied and stored in digital or analog media memory, and memory 15 can include, either in total or in part, the storage capability provided by any such cartridge, diskette or compact disc. In a particular embodiment, apparatus 11 is capable of playing electronic games in a networked computer environment such as the Internet. In this case, memory 15 can include resident memory and/or central memory and apparatus 11 is configured with a browser application and other conventional wares and software for facilitating network 19 access and negotiation and these features will readily occur to those skilled in the art.

Set forth for purposes of orientation and reference in connection with the ensuing detailed description of the preferred embodiment of the instant invention, the foregoing brief description of electronic game apparatus 11 is intended to be generally representative of typical dedicated and non-dedicated electronic game devices and computers and game systems. Details not specifically illustrated and described will be readily understood and appreciated by those skilled in the art.

The invention proposes providing certain game instrumentalities or components to electronic games in the form of an "attachment" to a consumer instrument 20, which is at least one of a product 21, a service 22 and an advertisement 23. As a matter of example, product 21 includes any consumer product such as a car, a food product, a clothing product, a video, a compact disk, a bag of potato chips, a candy bar, a book, a magazine, a bag of pet food, a newspaper, and otherwise any perishable and non-perishable consumer good. Service 22 includes restaurant services, movie theater services, personal training services, carpet cleaning services, tanning services, car wash services, and otherwise any service by which consumers may purchase. Advertisement 23 includes printed and broadcast advertisements including newspaper advertisements, magazine advertisements, radio advertisements, televised advertisements, etc. In accordance with the invention, only by purchasing a product or service or by accessing an advertisement may a player obtain an electronic game component.

In this regard, the invention provides attaching at least one game component 30 to consumer instrument 20 and more can be attached if desired. Game component 30 is considered one that a player needs or desires to play a predetermined electronic game 31 or to otherwise progress through an electronic game that is facilitated by game software 17, which can be any game software. In an exemplary embodiment, component 30 is housed in a memory device 32, which is removably attached to a consumer product or to the packaging of a consumer product, or otherwise provided to a customer by a merchant in the sale of or otherwise upon the completion of the sale of a product or service. The physical attaching can be facilitated with a mild adhesive, and packaging can be modified to accommodate and hold device 32 in any desired manner. Memory device 32 includes a data cartridge, diskette or compact disc or the like that houses component 30 in the form of software that may be downloaded to apparatus 11 for the purpose of essentially upgrading game software 17 with the functionality provided by component 30. The data transfer between memory device 32 and apparatus 11 is facilitated by a data transfer system 33, which, in this embodiment, includes a conventional and well known data transfer architecture between a data cartridge, diskette or compact disc and drive 16 such as any one of a variety of forms presently known and used in connection with virtually every computer and game device. Downloading of the component 30 from device 32 can occur upon docking or loading with drive 16 or in response to user commands entered at input device 14 after docking or loading and any downloading event may be carried out in either fashion in any embodiment of the invention. More likely than not, a downloading event will usually take place and be facilitated in response to user inputs or commands.

Those of ordinary skill will readily appreciate that the art is replete with various systems and methods for facilitating data transfer between electronic components and, more particularly, from one storage or memory device to another storage or memory device including wired and wireless data transfer architectures, display-to-display data transfer architectures, encoded data stream systems that facilitate data transfer between opposing displays or electronic devices, etc. In the case of a hand—hand game device, the invention contemplates that a user may take his or her hand-held game device to a place of business where a product or service is to be purchased. Upon completion of the sale, the invention provides that the user will be given access to memory device 32 for the purpose of interacting with it and downloading component 30. Memory device 32 may be housed in a computerized kiosk or other form of data transfer station 36, and data transfer system 33 can include any variety of system, including the formerly described data transfer system, capable of facilitating a downloading of component 30 from memory device 32 such as by docking the hand-held game device into a data transfer serial port, by initiating a wireless data transfer such as between a display of the hand-held device and a reference display at the data transfer station, etc. Depending on the type of data transfer architecture employed, those of ordinary skill will readily appreciate that the invention may be configured with any necessary systems and apparatus for facilitating any suitable form of data transfer between memory devices.

In another embodiment, consumer instrument 20 includes a document 40, such as a receipt from the sale of goods or services, which is provided to a consumer after the purchase of one or more goods or services. Document 40 is furnished with a password 41 that a user can, for instance, input into apparatus 11 for the purpose of unlocking component 30' from password-protected memory 35 of memory 15 or of other memory such as that accessible over network 19 by way of a publicly—or privately—accessible web site, or other password-protected memory such as that accessible by way of a data transfer station 42 or computer or the like provided by a merchant of goods or services. Document 40 can be incorporated into a printed advertisement, and also conveyed in the broadcast of radio and television advertisements. A token that is capable of providing access to password-protected memory 43 may also be issued at the completion of a sale of one or more goods and services. The token can be of a type that is actually inserted into data transfer station 42 for actuating station 42, much like a coin-operated vending machine. In other embodiments, the token can be of a type that incorporates a magnetic strip that is to be swiped through a magnetic code recognition device, or a type that issues access to password-protected memory 43 in response to an electronically-facilitated wireless recognition event.

The invention thus provides new systems and methods for enhancing electronic game functionality, and for adding, activating and unlocking electronic game functionality, characters and player powers and abilities. By associating components of electronic games with products, services and advertisements, it is envisioned that consumer activity will be enhanced and that consumer spending will benefit and be caused to flourish. In accordance with the invention, an electronic component of the invention can be in the form of data that is transferred or otherwise downloaded to apparatus 11 by any conventional data transfer mechanism, or otherwise accessible by way of a password, token, etc. A component obtained by a user in accordance with the invention can be programmed to last indefinitely or for a predetermined period of time, after which the player may be required to re-obtain the component as herein specifically described.

The invention has been described above with reference to one or more preferred embodiments. However, those skilled in the art will recognize that changes and modifications may be made to the described embodiments without departing from the nature and scope of the claimed invention. Accordingly, any such changes and modifications to one or more of the embodiments herein chosen for purposes of illustration are intended to be included within the scope of the invention as assessed only by a fair and reasonable interpretation of the ensuing claims.

Having fully described the invention in such clear and concise terms as to enable those skilled in the art to understand and practice the same, the invention claimed is:

1. An electronic game enhancement system comprising:
   an electronic game stored in memory;
   electronic apparatus having an input device responsive to commands for accessing and playing the electronic game;
   an electronic component stored in password-accessible memory, the electronic component for enhancing the electronic game;
   a consumer instrument associated with a password to the password-accessible memory; and
   the electronic component being accessible by the electronic apparatus in response to entry of the password into the electronic apparatus with the input device.

2. The electronic game enhancement system of claim 1, wherein the consumer instrument comprises a consumer product, and the password is attached to one of the consumer product and packaging of the consumer product.

3. The electronic game enhancement system of claim 1, wherein the consumer instrument comprises at least one of a product and a service.

4. The electronic game enhancement system of claim 1, wherein the consumer instrument comprises an advertisement, and the password is incorporated with the advertisement.

5. The electronic game enhancement system of claim 1, wherein the consumer instrument comprises a document, and the password is affixed to the document.

6. The electronic game enhancement system of claim 1, wherein the electronic apparatus comprises a personal game device.

7. The electronic game enhancement system of claim 1, wherein the electronic apparatus comprises a computer.

8. A method of enhancing electronic game functionality comprising steps of:
   providing an electronic game stored in memory and electronic apparatus having an input device responsive to commands for accessing and playing the electronic game;
   providing an electronic component stored in password-accessible memory, the electronic component for enhancing the electronic game;
   associating a password to the password-accessible memory with a consumer instrument; and
   obtaining the password from the consumer instrument; and
   entering the password into the electronic apparatus with the input device for gaining access to the password-accessible memory and enhancing the electronic game with the electronic component.

9. The method of claim 8, wherein the step of associating the password to the password-accessible memory with a consumer instrument further includes attaching the password to one of a consumer product and packaging of a consumer product.

10. The method of claim 8, wherein the step of associating the password to the password-accessible memory with a consumer instrument further includes permitting access to the password after payment of a service.

11. The method of claim 8, wherein the step of associating the password to the password-accessible memory with a consumer instrument further includes incorporating the password with an advertisement.

12. The method of claim 8, wherein the step of associating the password to the password-accessible memory with a consumer instrument further includes affixing the password to a receipt.

* * * * *